Figure 1:
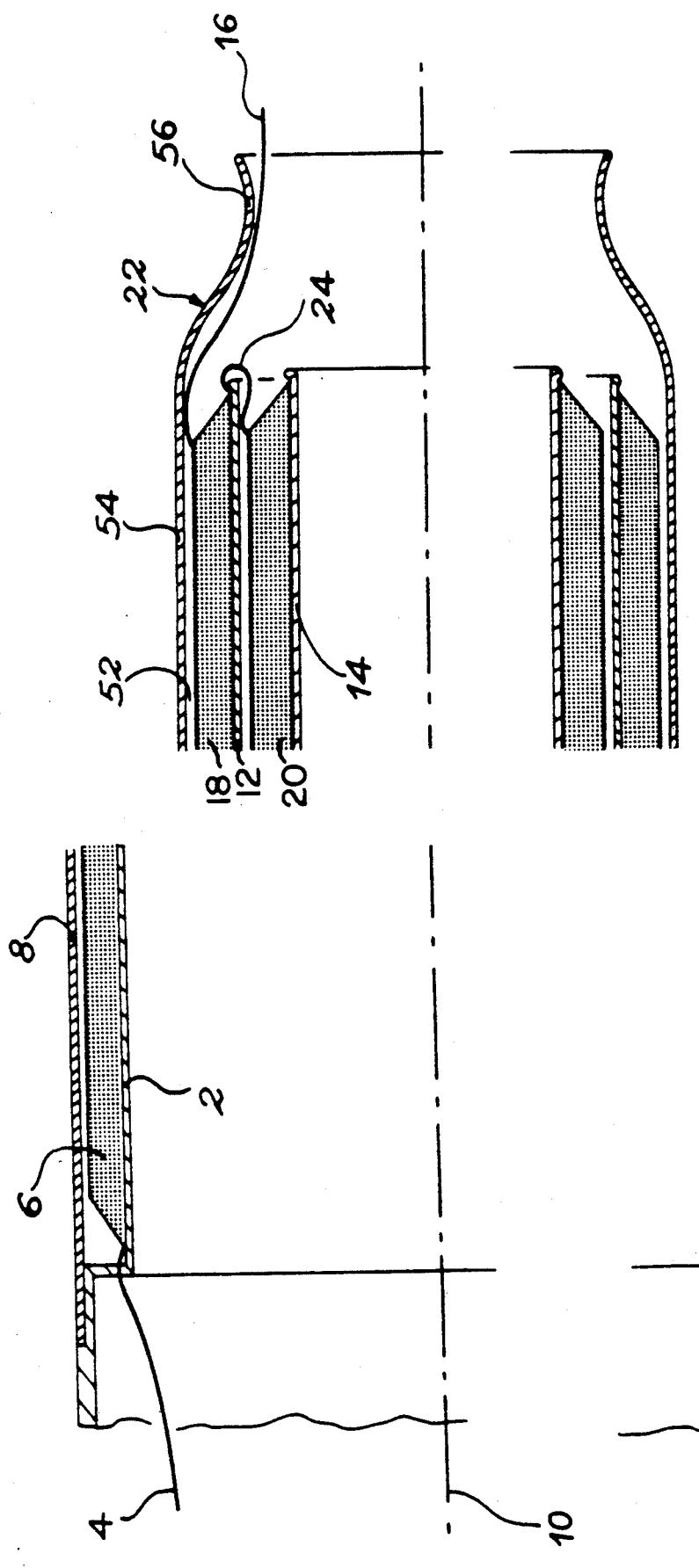

United States Patent [19]

Maree et al.

[11] Patent Number: 5,022,603
[45] Date of Patent: Jun. 11, 1991

[54] COIL OF VERY LONG OPTICAL FIBRE USABLE ON A WIRE-GUIDED MISSILE

[75] Inventors: Michel Maree, Gif sur Yvette; Patrick Moreau, Antony, both of France

[73] Assignee: Societe Nationale Industrielle et Aerospatiale, France

[21] Appl. No.: 496,920

[22] Filed: Mar. 21, 1990

[30] Foreign Application Priority Data

Mar. 22, 1989 [FR] France .................................. 89 03752

[51] Int. Cl.$^5$ ..................... B65H 55/00; B65H 49/02; F42B 13/56
[52] U.S. Cl. .................................. 242/167; 242/128; 242/159; 102/504
[58] Field of Search ............... 242/167, 166, 159, 128, 242/1; 102/504

[56] References Cited

U.S. PATENT DOCUMENTS

| | | | |
|---|---|---|---|
| 3,114,456 | 12/1963 | Van Billiard | 242/159 X |
| 3,266,423 | 8/1966 | Simpson | 242/159 X |
| 4,271,761 | 6/1981 | Canning et al. | 242/128 X |
| 4,326,657 | 4/1982 | Arpin et al. | 242/128 X |
| 4,903,607 | 2/1990 | Clark | 242/159 X |
| 4,925,125 | 5/1990 | LeCompte | 242/159 X |

FOREIGN PATENT DOCUMENTS

| | | |
|---|---|---|
| 128735 | 6/1900 | Fed. Rep. of Germany . |
| 285901 | 7/1915 | Fed. Rep. of Germany . |
| 752880 | 7/1933 | France . |
| 847102 | 6/1939 | France .................................. 242/167 |

Primary Examiner—Stanley N. Gilreath
Attorney, Agent, or Firm—Finnegan, Henderson, Farabow, Garrett and Dunner

[57] ABSTRACT

The coil according to the invention has normal dimensions, but contains a considerable optical fiber length.

It is constituted by a main cylindrical support (12) about which is wound a first part (18) of the optical fiber (16), which is to be unwound by pulling. It is constituted by a first concentric, supplementary cylindrical support (14) placed within the main cylindrical support (12), a second part (20) of the optical fiber (16) being wound around said first supplementary support (14), the inner layer of the first part (18) of the optical fiber (16) being directly connected to an outer layer of the second part (20) of the optical fiber (16).

9 Claims, 3 Drawing Sheets

COIL OF VERY LONG OPTICAL FIBRE USABLE ON A WIRE-GUIDED MISSILE

The invention relates to wire-guided missiles, particularly using optical fibres.

Wire-guided missiles, i.e. which are guided by means of a remote control wire unwound at the time of firing between the missile and the firing station are widely used. Therefore this wire is a flexible member for transmitting information to the missile. The information is in particular constituted by instructions or orders, in order to modify the trajectory during flight. This wire-guidance method is used for short or medium range missiles, i.e. up to 10 kilometers, particularly due to its low cost and relative insensitivity to scrambling. The wire can be constituted by several metal conductors equipped with organic material carrier filaments, such as of polyester, polyaramide, etc. The passband of such a link is limited to a few hundred Hertz, which limits the onboard-wire length to approximately 10 to 12 Km.

The construction of such remote control wire coils mounted in the rear part of missiles obeys empirical rules. In particular, the l/d ratio of the length to the diameter of the coil must not exceed a given number equal to approximately 2. Moreover, the number of layers of superimposed contiguous turns must not exceed about 40. When these conditions are fulfilled, the range of the missile is a function of the external diameter of the coil. Bearing in mind the relatively short range of wire-guided missiles, no particular problem has hitherto occurred with respect to the design of the missiles and in particular that of the wire coil.

A remarkable advance is provided by the use of an optical fibre in place of the metal conductor-based remote control wire. Thus, the passband of the optical fibre is a million times better than that of the metal conductor and consequently permits the transmission of information of a completely different type, particularly with regards to the flow rate. Thus, video images taken by an on-board camera can be transmitted from the missile to the firing station. Moreover, the optical fibre seems virtually insensitive to scrambling. These qualities make it possible to envisage transmissions with a length of about 100 kilometers, said transmissions taking place in both directions, i.e. firing station to missile and missile to firing station.

However, the optical fibre coils obey the same design and winding rules as coils with remote control metal wire. Under these conditions and for such considerable lengths, the diameter of the coil can be prejudicial to the missile, because it can lead to a number of disadvantages. Thus, an excessive diameter leads to an increase in the drag of the missiles and therefore to the use of heavier, higher performance and therefore more expensive propulsion systems. The discretion of the missile is reduced by the increase in its dimensions, which increases the overall dimensions of the carrier.

The object of the invention is to obviate these disadvantages by equipping missiles with coils having normal dimensions, but with a very long optical fibre.

Therefore, an object of the invention is a coil of very long optical fibre constituted by a main cylindrical support about which is wound layer-by-layer a first part of the optical fibre, an inner layer wound directly onto the main cylindrical support up to an outer layer and in which the optical fibre is unwound by pulling from the outer layer to the inner layer.

According to the invention, the coil comprises a first concentric supplementary cylindrical support placed within the main cylindrical support, a second part of the optical fibre being wound around this first supplementary support, the inner layer of the first part of the optical fibre being directly connected to the outer layer of the second part of the optical fibre.

Thus, the invention utilizes the superimposing of several winding stages, each stage respecting the aforementioned operating conditions.

In order to improve the holding or maintaining of the coil, the main support and supplementary support have in each case on a first, so-called unwinding end a flange.

It is advantageous to use several concentric, supplementary cylindrical supports placed within one another, the first supplementary support being placed within the main support and onto which are respectively wound the same given number M of successive parts of the optical fibre, the inner layer of the part of rank M being connected directly to the outer layer of the part of rank $M+1$, each supplementary support having a flange on a first unwinding end of each supplementary support.

In a preferred embodiment of the coil according to the invention, the flange is locally notched to permit the direct passage of the optical fibre from the inner layer of the part of the fibre of rank M to the outer layer of the part of the fibre of rank $M+1$, the last turn of the outer layer of the fibre part of rank $M+1$ being close to the unwinding end of the support of rank M. This arrangement facilitates the passage from one winding stage to the other during the unwinding of the optical fibre.

According to a feature of the invention, the first turn of the outer layer of rank $M+1$ corresponds with the unwinding end of the support of rank M and having the flange. This also facilitates the unwinding of the optical fibre during passages between individual stages.

In the invention, the coil has a cover or cap concentric with the supports and having a predetermined diameter so as to surround the first part of the optical fibre placed on the main support, whilst leaving a space permitting the swelling or ballooning of the optical fibre during its unwinding.

This cover can be extended beyond the unwinding ends and is terminated by an end part having a diameter smaller than the initial diameter of the cover.

According to a possible construction of the coil according to the invention, each support of rank M is extended beyond the first turn of the outer layer of the optical fibre part of rank $M+1$, so as to form a cover for said supplementary part of rank $M+1$, the diameter of the thus formed cover decreasing progressively.

Another main object of the invention is a missile having a coil as described hereinbefore, which is mounted at the rear of the missile and which permits a bidirectional link with the ground installation and which can be unwound during the travel of the missile by the unwinding ends of the optical fibre supports.

The invention is described in greater detail hereinafter relative to non-limitative embodiments and the attached drawings, wherein show:

FIGS. 1a and 1b two-longitudinal half-sections of different wire coils providing an explanation of the design of the coil according to the invention.

Figure 2:
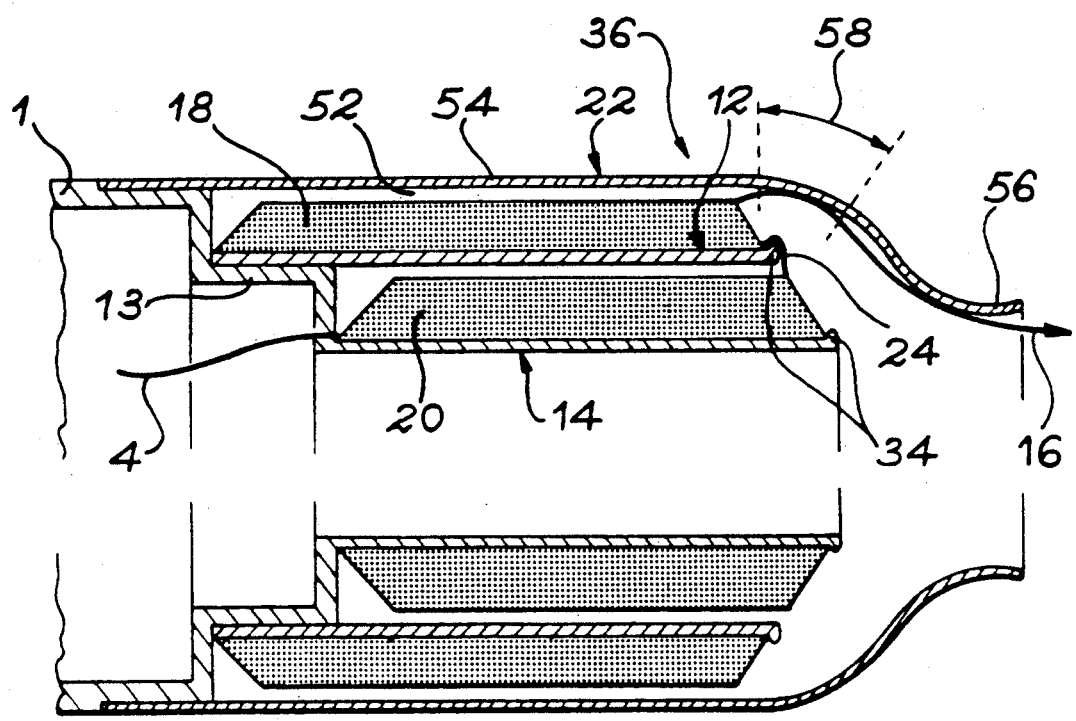

FIG. 2 a section of the first embodiment of the coil according to the invention.

Figure 3:
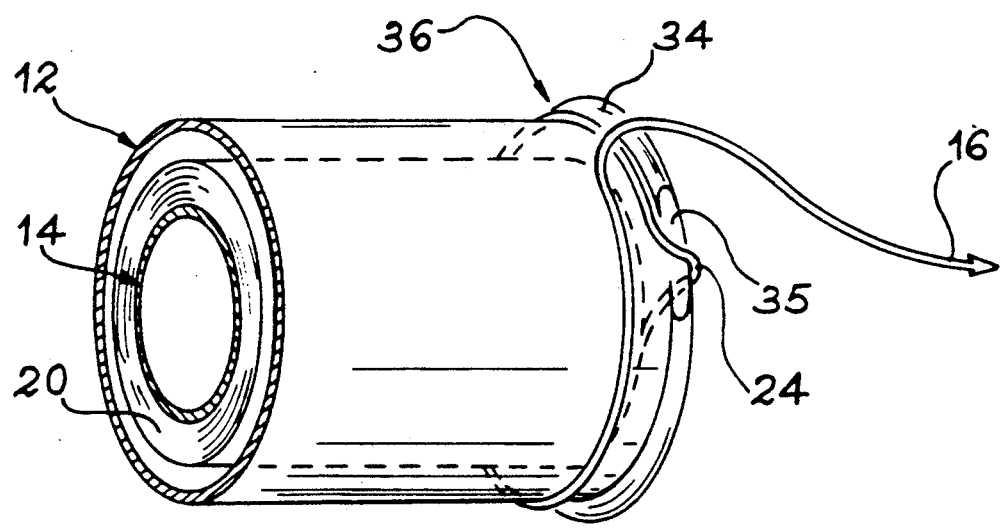

FIG. 3 a view of a support of the coil according to the invention.

Figure 4:
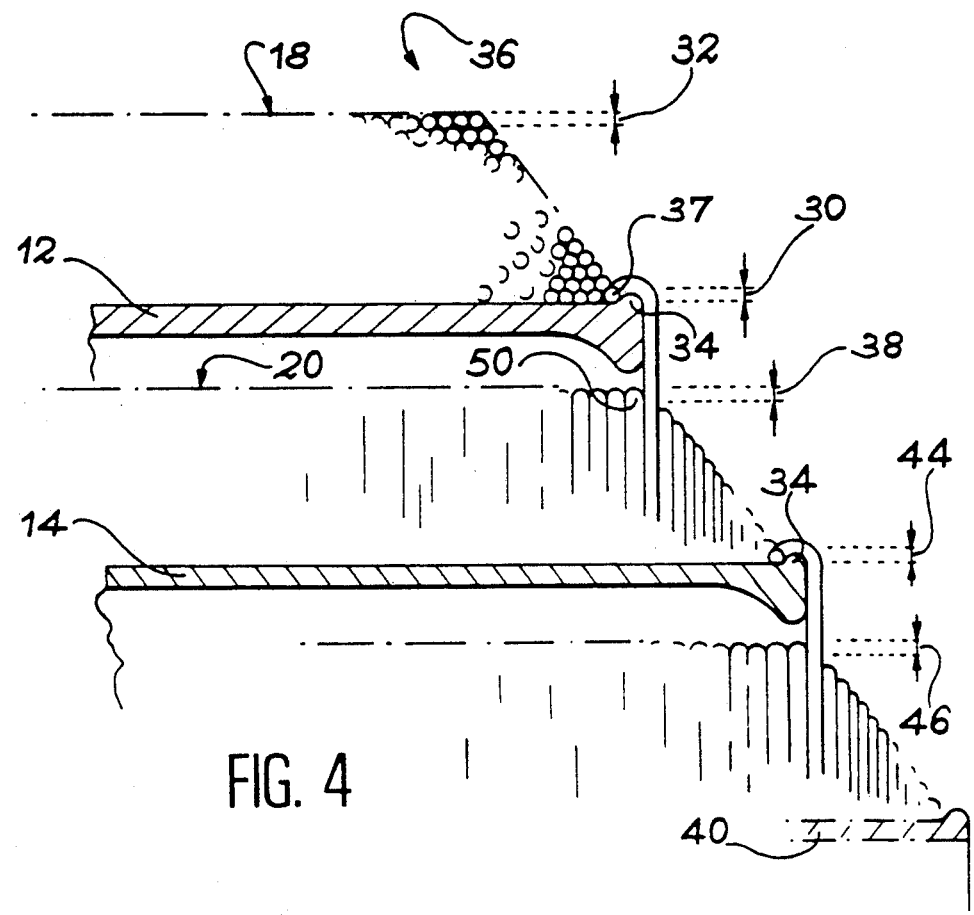

FIG. 4 a partial explanatory view of the passage of the fibre between two winding stages in the coil according to the invention.

Figure 5:
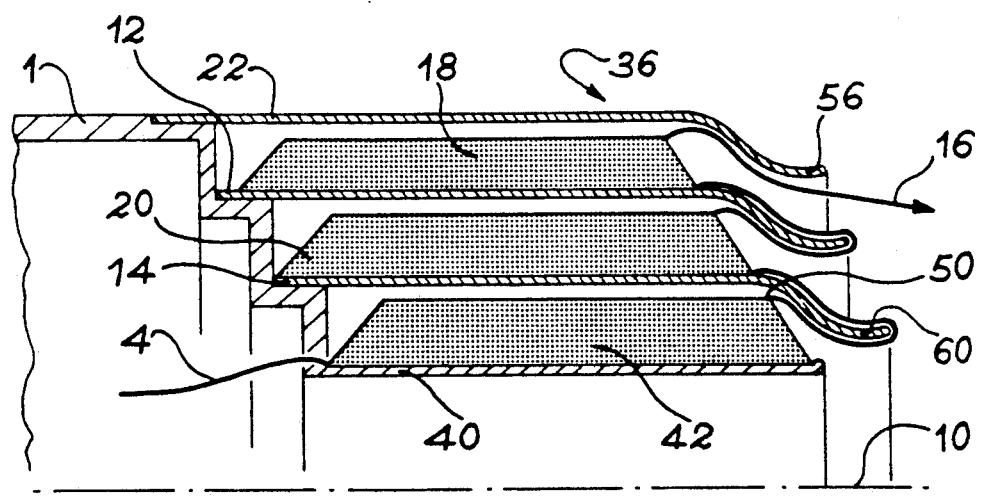

FIG. 5 a second variant of the coil according to the invention.

FIG. 1A is a half-section of an optical fibre coil of longitudinal axis 10 installed within a missile, so as to ensure that the latter has a long range. The design of such a coil is the same as for the prior art coils, i.e. it has a single support 2 about which is wound an optical fibre 4, over a thickness representing approximately 40 optical fibre layers 6. The diameter of such a coil is a function of the distance to be covered by the missile. Therefore the diameter is relatively large. As stated hereinbefore, this leads to a rise in the overall dimensions of the missile, leading to the aforementioned disadvantages. Everything is surrounded by a cover 8 extending the missile body.

FIG. 1B is a partial section of the coil according to the invention, in its simplest form. This coil is positioned around axis 10, so as to be concentric to the coil part shown to the left. It has a main cylindrical support 12, whose diameter is approximately the same as that of the supports of the prior art coils in the case of a short range. Around said cylindrical main support 12 is wound a first part 18 of the optical fibre 16 over a thickness identical to that shown in the left-hand part of the drawing. Thus, this thickness corresponds to the thicknesses normally encountered on coils equipping short and medium range missiles.

In order to obtain a greater missile range, it is necessary to have a greater optical fibre length. Therefore, the main feature of the invention is to arrange several coiled optical fibre stages. The design of each stage is such that the stages obey the design rules of coils or windings, as referred to in the preamble of the description. More specifically, the length to diameter ratio of each coil is approximately 2 and the number of optical fibre layers on the same coil does not exceed 40. Therefore a first supplementary support 14 is positioned within the main support 12, so as to be concentric thereto. It supports a second part 20 of the optical fibre 16, which is wound around the first supplementary support 14 in the same way as the first part 18 of fibre 16. Everything is surrounded by the main cylindrical part 54 of a cap or cover 22. The latter has an end 56 projecting beyond supports 12 and 14 and having a diameter smaller than that of the main cylindrical part 54. This contracted form serves to guide the optical fibre 16 during its unwinding.

As a result of the presence of two concentric coils, it is readily apparent that the total surface of the sections wound around the main support 12 and the supplementary support 14 can be greater than the surface of a single wound section of a prior art coil. This total surface of the wound sections corresponds to the distance to be travelled by the missile and would involve a larger diameter in the case of a prior art coil and as shown in FIG. 1A.

FIG. 2 shows a coil according to the invention. It is mounted on a missile body 1, the missile having an adapted part 13, to which can be connected the main support 12 and supplementary support 14 of the coil. Thus, the first part 18 of the optical fibre 16 is wound onto the main support 12. The coil is formed in a conventional manner respecting the standard coil design rules. The optical fibre 16 is wound layer-by-layer from an internal layer in contact with the main support 12 to the final layer which will be the first to be unwound.

The supplementary cylindrical support 14 is positioned in fixed manner with respect to the missile body 1 via the joined part 13. Onto said supplementary support 14 is wound a second part 20 of optical fibre 16. The outer layer of said second part 20 is constituted by the extension of the inner layer of the first fibre part 18 and which forms the optical fibre fragment 24. Therefore the unwinding of the optical fibre 16 takes place without interruption from the first part 18 to the second part 20 of optical fibre 16.

The main support 12 can have a first end 36 by which the optical fibre 16 is unwound by pulling, a flange 34 serving as a shim for the stacking of the different optical fibre layers of the first part 18. In this way, said first part 18 is maintained in place. The supplementary support 14 can be equipped with the same flange 34, which fulfills the same function with respect to the second optical fibre part 20. The final turn of optical fibre 16 is connected to the interior of the missile, where it is fixed and connected to the equipment involved for the transmission in question.

Everything is surrounded by a cover 22 fixed to the missile body 1. Cover 22 is formed by a main cylindrical part 54, whose diameter corresponds to the external diameter of the missile body. It concentrically surrounds the two coiled parts of the optical fibre, whilst leaving a space 52 between the first part 18 and its inner surface. Space 52 serves to permit the ballooning or swelling phenomenon 58 of the optical fibre 16 during the unwinding of the latter. Cover 22 is preferably terminated by an end part 56 having a diameter smaller than that of the main part 54 of cover 22. The function of this arrangement is to limit the displacement of the optical fibre 16 once it has passed outside cover 22.

FIG. 3 shows a constructional detail of flange 34 of supports 12 and 14. In order to permit the continuous unwinding of optical fibre 16 and in particular during the passage from one wound part to the other, the flange 34 is interrupted. This interruption enables the optical fibre part 24 from the final layer wound onto support 12 to pass to the supplementary coil without passing via the flange. Thus, this could lead to a sudden tension change in the optical fibre during unwinding. The interruption can be in the form of a flat 35 or a notch. No matter what construction is adopted, at the flange 34 the optical fibre must only have a local diameter increase. The transition part 24 of the optical fibre is consequently reduced to a minimum, so as to avoid the whiplash phenomenon occurring when unwinding reaches an unbonded or unadhered fibre length. Thus, in this case, the fibre is released more easily than a given fibre length.

Another method can be used for eliminating the whiplash phenomenon. It consists of locally increasing the rigidity or stiffness of the fibre. This can be obtained either by the use of a varnish-type product, or by the local edition of a lightweight sheath.

In the wound parts 18, 20 of the optical fibre, the turns are preferably slightly stuck to one another.

With reference to FIGS. 4 and 5, the invention provides for the use of several supplementary supports 14 and 40. This arrangement is useful for providing a very considerable optical fibre length in the case of very long range missiles.

FIG. 4 shows the first coil 18 placed on the main support 12 and constituted by different optical fibre layers placed between the inner layer 30 wound around support 12 and the outer layer 32. The inner layer 30 on the main cylindrical support 12 is connected to the outer layer 38 of the following optical fibre part 20. The latter has an inner layer 44 in contact with the first supplementary support 14. The optical fibre is extended up to the outer layer 46 of optical fibre part 42 placed on the following supplementary cylindrical support 40. In general terms, the coil according to the invention can have a given number M of supplementary cylindrical supports 14, 40 etc. The first supplementary support 14 is placed within the main support 12 and the supplementary support 40 of rank M+1 is placed within the supplementary support 14 of rank M. The inner layer 30 or 44 of an optical fibre part 18 or 20 of rank M is connected to the outer layer 38 or 46 of part 20 or 42 of rank M+1. Obviously, the final optical fibre part 42 placed on the final supplementary support 40 is terminated by a connection with the interior of the missile. Each supplementary support 14 and 40 preferably has a flange 34 on its first end 36 by which the optical fibre 16 is unwound. Each flange 34 is also locally notched so as to permit respective passages of fibre 16 from one stage to the other. Consequently the winding of each stage is such that the final turn 50 of the outer layer 38 or 46 of the fibre part M+1 is located close to the unwinding end 36 of the preceding support of rank M. The last turn 50 consequently corresponds with the first turn 37 of the support with the preceding rank M—1, 12 or 14.

With reference to FIG. 5, each support 12 or 14 of rank M can be extended beyond the first fibre 50 of the outer layer 38 or 46 of the following optical fibre part 20 or 42 of rank M+1. This makes it possible to form a cover for optical fibre part 20 or 42 of rank M+1. In a manner identical to the main cover 22 and in particular its contracted end part 56, the diameter of each thus formed cover 60 can progressively decrease. In this case, the optical fibre 16 passes round said end part 60 during each passage from one stage to the next.

The main application of the coil according to the invention is to a missile. In this case, the coil is mounted at the rear of the missile, so as to permit the unwinding of the fibre during the flight of the missile. This unwinding takes place by the unwinding end 36 of supports 12, 14 and 40 of optical fibre 16.

We claim:

1. A coil for a long optical fibre comprising:
   (a) a main cylindrical support;
   (b) at least one supplementary cylindrical support placed within and concentric with the main cylindrical support;
   (c) a long optical fibre having: a first fibre part wound in layer-by-layer form on the main cylindrical support and having an inner layer thereof wound directly onto and in contact with the main cylindrical support and an outer layer thereof on the winding of said first part; and a second fibre part wound in layer-by-layer form on said supplementary cylindrical support and having an inner layer thereof wound directly onto and in contact with the supplementary cylindrical support and an outer layer thereof on the winding of the second fibre part, the fibre of the outer layer of the second fibre part being directly connected to the fibre of the inner layer of the first fibre part.

2. The coil according to claim 1, wherein the main cylindrical support and the supplementary cylindrical support each have an unwinding end from which the optical fibre can be unwound by pulling the optical fibre, and the unwinding end of each of the cylindrical supports is provided with a flange extending radially outward therefrom.

3. The coil according to claim 2, comprising a plurality of successively smaller diameter supplementary cylindrical supports, each arranged within and concentric with a preceding cylindrical support, and a plurality of parts of the optical fibre, each part wound in layer-by-layer form on a corresponding cylindrical support and having an inner layer thereof in contact with its corresponding cylindrical support and an outer layer thereof, the fibre of the outer layer being directly connected to the fibre of the inner layer of the preceding cylindrical support.

4. The coil according to claim 3, wherein each of the cylindrical supports ends longitudinally beyond the first turn of the outer layer of the optical fibre part wound on the next succeeding smaller diameter cylindrical support.

5. The coil according to claim 2, wherein each of the flanges is locally notched so as to permit the optical fibre of the inner layer of each fibre part to pass directly to a next smaller diameter supplementary cylindrical support, the last turn of the outer layer of the fibre part on each cylindrical support being positioned close to the unwinding end thereof and its longitudinal position corresponding to the longitudinal position of the first turn of the optical fibre forming the inner layer on the preceding cylindrical support.

6. The coil according to claim 5, further including a missile body having a rear portion, wherein each of the cylindrical supports has an unwinding end from which the optical fibre can be unwound by pulling and wherein the coil is mounted at the rear portion of the missile so as to permit the unwinding of the optical fibre from the unwinding ends of the cylindrical supports during the flight of the missile and provide a wide passband bidirectional link between the missile and a ground installation.

7. The coil according to claim 1, further including a cover having an initial diameter and being concentric with the supports, the cover surrounding the first fibre part and spaced therefrom to allow ballooning of the optical fibre during its unwinding.

8. The coil according to claim 7, wherein the cover extends longitudinally beyond the unwinding ends and has an end part with a diameter smaller than the initial diameter thereof.

9. The coil according to claim 1, further including a missile body having a rear portion, wherein each of the cylindrical supports has an unwinding end from which the optical fibre can be unwound by pulling and wherein the coil is mounted at the rear portion of the missile so as to permit the unwinding of the optical fibre from the unwinding ends of the cylindrical supports during the flight of the missile and provide a wide passband bidirectional link between the missile and a ground installation.

* * * * *

UNITED STATES PATENT AND TRADEMARK OFFICE
CERTIFICATE OF CORRECTION

PATENT NO. : 5,022,603
DATED : June 11, 1991
INVENTOR(S) : Michael Maree and Patrick Moreau It is certified that error appears in the above-identified patent and that said Letters Patent is hereby corrected as shown below:

Front page, Assignee, change "Societe Nationale Industrielle et Aerospatiale" to -- Aerospatiale Societe Nationale Industrielle--.

In the drawings, below "FIG. 1B" delete the legend "PRIOR ART."

Column 2, line 5, change "tarY" to --tary--.

Column 2, line 6, change "directlY" to --directly--.

Claim 4, column 6, line 22, change "ends" to --extends--.

Signed and Sealed this

First Day of December, 1992

Attest:

DOUGLAS B. COMER

*Attesting Officer*     *Acting Commissioner of Patents and Trademarks*